United States Patent [19]

Sodal et al.

[11] Patent Number: 4,847,493

[45] Date of Patent: Jul. 11, 1989

[54] CALIBRATION OF A MASS SPECTROMETER

[75] Inventors: Ingvar E. Sodal; Ronald R. Bowman; Jerritt Hansell, all of Boulder, Colo.; Justin S. Clark, Salt Lake City; Michael J. Criddle, West Valley, both of Utah

[73] Assignee: Masstron, Inc., Boulder, Colo.

[21] Appl. No.: 107,283

[22] Filed: Oct. 9, 1987

[51] Int. Cl.[4] .................... B01D 59/44; G01D 18/00; H05H 3/02

[52] U.S. Cl. .................... 250/252.1; 250/288; 250/282

[58] Field of Search .................... 250/288, 288 A, 289, 250/281, 282, 252.1

[56] References Cited

U.S. PATENT DOCUMENTS

| | | | |
|---|---|---|---|
| 2,551,637 | 5/1951 | Robinson | 250/252.1 |
| 2,714,164 | 7/1955 | Riggle et al. | 250/289 |
| 2,880,323 | 3/1959 | Reinecke et al. | 250/289 |
| 3,270,773 | 9/1966 | Brunnée | 250/288 |
| 3,926,209 | 12/1975 | Sodal et al. | 137/487.5 |
| 3,950,641 | 4/1976 | Evans et al. | 250/283 |
| 4,151,738 | 5/1979 | Hyer et al. | 73/1 G |
| 4,167,667 | 9/1979 | Hall et al. | 250/288 |
| 4,207,465 | 6/1980 | Favre et al. | 250/288 |
| 4,260,886 | 4/1981 | Grilletto et al. | 250/288 |
| 4,560,871 | 12/1985 | Bowman et al. | 250/288 |

*Primary Examiner*—Bruce C. Anderson
*Attorney, Agent, or Firm*—Sheridan, Ross & McIntosh

[57] ABSTRACT

Apparatus and method are provided for calibrating a mass spectrometer. The calibration hardware includes a relatively small, relatively low pressurized tank for containing calibration gas. The calibration gas tank is preferably located inside the same housing that contains the ion source assembly and the analyzing section of the mass spectrometer. Each of the calibration gas and sample gas, whose components are to be determined, communicates with its own associated valve. These two valves control the flow of a selected one of the sample gas and the calibration gas to the ion source assembly. The calibration gas valve has an extremely low leakage rate and can be controlled to permit the passage of very low flow rates of calibration gas, which can be of benefit in checking the linearity associated with the ion source assembly pressure. For each calibration procedure, very small amounts of calibration gas are utilized, in a range around $10^{-5}$ STD cc. A related method for conditioning an electron multiplier device is also disclosed in which the gain of one or more selected channels thereof is modified so that the output signal strengths of the device are comparable in magnitude. Calibration of the mass spectrometer occurs frequently and automatically. In one emobodiment, the mass spectrometer calibration is a direct function of each mass spectrometer measurement. Consequently, improved accuracy and heightened sensitivity are achieved in the mass spectrometer, while reducing the use or loss of valuable calibration gas.

14 Claims, 4 Drawing Sheets

CALIBRATION OF A MASS SPECTROMETER

FIELD OF THE INVENTION

The present invention relates to mass spectrometers and, in particular, to apparatus and method for calibrating a mass spectrometer.

BACKGROUND INFORMATION

Mass spectrometers are used in determining the concentration of gas components of a gas mixture. In order to achieve the high degree of accuracy and reliability that is required in determining the concentration of the gas components, it is important that the mass spectrometer be properly calibrated. Generally, there are two types of calibration—an initial or a full calibration and the calibration conducted during operation using a reference or calibration gas mixture. The initial or the full calibration is performed infrequently, for example, during manufacture and before shipment or when it is decided that a complete calibration is necessary for desired accuracy. In conjunction with the much more frequent calibration conducted by the user in order to reduce the times that a more time extensive full calibration is performed, significant amounts of calibration or reference gas are required for each calibration, with much of the calibration gas being wasted. In conducting a single calibration procedure, a typical range of calibration gas that is allowed to exit the tank containing the calibration gas is a minimum of about fifty cubic centimeters (cc) to several hundred cubic centimeters of the gas. Because only a very small volume of calibration gas is actually utilized in performing a proper calibration, much of the calibration gas is wasted. This loss of calibration gas is often times not acceptable because of the cost of the calibration gas. Relatedly, because of the amount of calibration gas that is used or lost for each calibration of a mass spectrometer, relatively infrequent calibrations of the mass spectrometer are made, e.g., instead of being implemented as frequently as every few minutes or even seconds, the calibration procedure is performed only after the passage of hours or even days from the previous calibration.

The importance of optimizing use of calibration gas is most evident when considering the cost of small volumes of calibration gas. In many instances, the cost of suitable calibration gas is in the range of hundreds of dollars for a few liters of calibration gas. The high cost of calibration gas becomes most apparent when considering a problem found in mass spectrometers used in determining and quantifying certain gases, such as mass spectrometers being used in the medical field, for example. For example, when oxygen is one of the component gases of an inputted sample gas mixture, the oxygen can chemically react with a carbonaceous film formed within the mass spectrometer, such as the carbonaceous film developed by a hot filament source in the ion source assembly. Such a reaction would produce carbon dioxide and carbon monoxide. Carbon monoxide tends to interfere with the obtaining of accurate measurement gas components, which are desirable to measure with the gas spectrometer. For example, the carbon monoxide would interfere with nitrogen gas determination because carbon monoxide and nitrogen have nearly the same mass. Such a problem could be avoided by providing an ion collection device that has an extremely high resolution; however, such a mass spectrometer would cost hundreds of thousands of dollars.

It is known to use a calibration gas in order to measure the magnitude of the interfering gas and generate a correction factor, for example, in a laboratory setting where conditions are suitable for readily determining and making the necessary corrections. However, for on-line mass spectrometer instruments, this has not been practical. First, the presence of the carbon-based gas or gases varies with time. Consequently, even though a measurement might have been taken prior to using the instrument in order to correct for the presence of any carbon-based gas, such a correction would soon be inaccurate because the amount thereof would vary over time with the use of the mass spectrometer. Second, in prior art systems, even if it were considered to calibrate and determine a correction factor at a very frequent basis, on the order of seconds, the cost of the isotopic gas used in calibrating would be prohibitive. It is highly desirable to use an isotopic gas, such as isotopic oxygen because the isotopic oxygen combines with the carbon-based substance in such a manner that it will be easily collected and detected on an ion collection plate of the mass spectrometer. For example, the amount of carbon monoxide interfering or contaminating a nitrogen channel of the ion collection plate can be determined using a channel that is able to identify isotopic carbon monoxide. That is, the amount of isotopic carbon monoxide that is found during the calibration procedure is directly related to the amount of carbon monoxide that contaminates a nitrogen channel and which is developed when the sample gas includes oxygen and nitrogen. Even though the use of isotopic gas is of a significant benefit to the calibration procedure, its usage has been severely limited because of its considerable cost. Thus, it would be desirable to calibrate a mass spectrometer using an isotopic gas while minimizing the amount of gas required for each calibration procedure and, at the same time, increasing the frequency of calibration.

A further factor, which is important to the accuracy and precision of a mass spectrometer, relates to whether or not the mass spectrometer has a linear response when the ion source pressure varies over a range of pressures. That is, during operation of the mass spectrometer, the ion source pressure can vary and erroneous gas component determinations can be made if there is no linear response. Consequently, it is desirable during the calibration procedure to vary the ion source pressure in order to check the linearity of the response. This can be accomplished by controlling the opening of a valve communicating with the ion source. If the valve opening is controlled in incremental steps, during the calibration procedure, it can be determined whether or not the pass spectrometer has a linear response. If not, it can be adjusted. However, in prior art systems, such a procedure would result in utilizing and/or wasting relatively large amounts of calibration gas in order to check the mass spectrometer output at various ion source pressures by varying the valve opening in incremental steps. Thus, to improve mass spectrometer accuracy, it would be desirable to conduct the calibration process by checking the linearity of the system. Again, this is not feasible in prior art mass spectrometers because of the relatively longer time taken and amount of calibration gas required to perform the calibration.

Additionally, because of the amount of gas that exits a calibration gas tank during each calibration procedure, it is common practice to utilize a relatively large tank for housing calibration gas used with a mass spectrometer. For example, such a tank may contain about 2–3 liters of calibration gas at 1500 psi. Tanks of many times greater in size are also used. Because of such sizes, the calibration gas tank must be located outside of the mass spectrometer housing. Furthermore, even though it is of this relatively large size, it is often necessary to replace the calibration gas tank with another, filled tank or to re-fill the calibration gas tank after a few months of use.

Another drawback to known mass spectrometer calibrating systems is the requirement that a pressure regulator be used with the calibration gas tank. More specifically, the calibration gas is housed in a pressurized tank so that relatively more gas can be contained in the same size tank. In some instances where highly volatile gases must be present in the calibration tank, the upper limit for the pressure may be in the order of 50 psi. This limits the total volume of calibration gas that can be contained in the tank and cost/calibration is much greater as there is increased cost in preparing the tank containing the gases. Because it is critical that the calibration gas supplied to the mass spectrometer be at or near atmospheric pressure, the pressure regulator is used to control the pressure of the gas outputted from the prior art calibration gas tank. In practical applications, in addition to providing a pressure regulator to control the pressure of the calibration gas outputted from the tank, the supply line or tube leading from the tank to the mass spectrometer is exposed to atmospheric pressure. This set-up assures that the low-pressurized ionization and analyzing chambers are not subject to a high pressurized calibration gas. However, because of this set-up, additional calibration gas is wasted each time a calibration procedure is performed since dead space is created in the supply line.

Another factor influencing the accuracy and precision of the mass spectrometer analysis relates to the operation of electron multiplier devices, which act as amplifiers of electrons of the gas components that are received by the mass spectrometer at its ion collection plate. Prior art electron multipliers, whether multichannel or single channel multipliers, do not take into account the fact that high level gases such as oxygen and nitrogen will develop a much greater signal strength than low level (tracer) gases. The difference in signal strength can be as much as a factor of $10^6$. In such a case, the high level gases would require little or no additional gain in the electron multiplier channel or channels while the low level gases would require a gain of about $10^3$. The present invention includes a method for changing the gain of the electron multiplier channel, or in the case of multiple channels, changing the gain of one or more channels of the multi-channel electron multiplier. However, a potential problem with this technique is that each channel of the electron multiplier could be operating on a different portion of its "aging curve" causing the relative gain between channels to change over time. The aging curve refers to the fact that the gain of the channel decreases as electric charge flows or ion current passes through the multiplier channel. That is, the gain of a channel of a microchannel plate, for example, decreases with the flow of cumulative electric charge through the channel. The aging is due to, for example, temperature changes, buildup of contaminants in the mass spectrometer, and the aging of the electron multiplier device itself. Consequently, to remedy this drift problem, while still providing selective signal gain for the different channels, it is important to calibrate frequently in order to determine any correction factor that would offset any adverse effect of individual channel gain change or amplifier drift.

With regard to previously issued patents which address calibration of mass spectrometers, U.S. Pat. No. 4,260,886 to Grilletto et al., issued Apr. 7, 1981, and entitled "Measurement of a Gas Constituent by a Mass Spectrometer" discloses that calibration can be achieved by using a reference sample that is about the same size as a test sample gas. U.S. Pat. No. 2,714,164 to Riggle et al., issued July 26, 1955, and entitled "Mass Spectrometer Sampling System" describes a mass spectrometer that includes a separate, calibrating channel, which may be the same in configuration as the channels for introducing unknown gas samples. U.S. Pat. No. 3,950,641 to Evans et al., issued Apr. 13, 1976, and entitled "Methods of Mass Spectrometry and Mass Spectrometers" discloses a two ion source mass spectrometer in which one ion source receives an unknown substance and the other ion source receives a known, reference substance whereby accurate chemical mass marking of the first mass spectrum generated using the unknown substance is provided using the second mass spectrum of the reference substance. None of the known mass spectrometers incorporates an automatic calibration feature.

Related to the present invention is the apparatus disclosed in U.S. Pat. No. 3,926,209 to Sodal et al., issued Dec. 16, 1975, and entitled "Method and Inlet Control System for Controlling a Gas Flow Sample to an Evacuated Chamber." This prior art apparatus describes a mass spectrometer that includes servo control for controlling the opening of a valve communicating with the ion source of a mass spectrometer for allowing a gas sample to pass into the mass spectrometer. Also related to the present invention is U.S. Pat. No. 4,560,871 to Bowman et al., issued Dec. 24, 1985, entitled "Actuator For Control Valves And Related Systems" and now assigned to the same assignee as the present invention. This patent discloses a valve for controlling the flow of an unknown gas into an ionization chamber of a mass spectrometer.

The calibration of apparatuses, other than mass spectrometers, is also well-known. U.S. Pat. No. 4,151,738 to Hyer et al., issued May 1, 1979, and entitled "Toxic Gas Monitor Having Automatic Calibration" discloses a system for monitoring for the presence of a toxic gas. The monitor is automatically calibrated by exposing a sensor to an atmosphere having a known concentration of the monitored constituent. In accomplishing the automatic calibration, atmospheric samples are measured periodically under the control of a sequencer and, at predetermined intervals, the sequencer initiates a recalibration cycle. In contrast to the present invention hereinafter described, such a system does not include a mass spectrometer in which a high degree of accuracy is required to sense and discriminate between a number of gases of a gas mixture. Importantly also, such a system apparently does not utilize expensive calibration gases and is, therefore, not concerned about wasting calibration gas.

SUMMARY OF THE INVENTION

The present invention is directed to reducing the amount of calibration gas that is used during calibration of a mass spectrometer and improving the time taken to perform a calibration procedure. The mass spectrometer instrument or apparatus of the present invention includes a housing for containing hardware used in determining the relative percentage of a number of gas components of a gas mixture. Also provided is a display unit for displaying desired results of the analysis of the inputted gas mixture. The display unit may be conveniently separated from the housing and located at a relatively short distance from the housing, or the display unit may be provided on the outside of the instrument housing itself.

The mass spectrometer hardware includes an ion source assembly for producing ions from an inputted gas mixture and an analyzing section for controlling movement of the ions and havng an ion collection plate, which receives or is contacted by gas ions of the inputted gas mixture. Communicating with the ion source assembly is a selected one of a sample gas and a calibration gas. The sample gas is typically provided by a source located outside of the mass spectrometer instrument housing. For example, the sample gas may be a respiratory gas mixture exhaled by a patient whereby the mass spectrometer is intended to measure the constituents of the respiratory gas mixture for monitoring or diagnostic purposes. In the present invention, the source of the calibration gas is a relatively small canister or tank, which contains the calibration gas, and which is located inside the housing of the mass spectrometer apparatus. The calibration gas contained in the tank is not pressurized since the amount of gas required for each calibration with this configuration is so small, in the order of $10^{-5}$ cc of calibration gas. A tank with an internal volume of a few hundred cubic centimeters contains an adequate amount of calibration gas at atmospheric pressure to last for several years even with very frequent calibrations.

The mass spectrometer hardware further includes a sample gas valve and a calibration gas valve. Each of these two valves has an extremely low leakage rate and each can be independently controlled to permit the passage of gas at a very low, controlled flow rate. The preferred valves are disclosed in the aforesaid U.S. Pat. No. 4,560,871. The outputs of the valves are applied to a common line or tube, which is connected to the ion source assembly. Such valve characteristics are important in conducting the calibration steps, without utilizing or wasting calibration gas. This is also important in connection with increasing the frequency of the calibration procedure. In particular, the mass spectrometer of the present invention can be re-calibrated in intervals of minutes and even seconds or less, not in terms of hours or even days as is commonly found in prior art calibration of mass spectrometers. It is even anticipated by the present invention that calibration occur in association with each measurement made of the sample gas by the mass spectrometer. For example, it appears feasible to calibrate a mass spectrometer after each breath of a patient, who is supplying a respiratory gas mixture to the mass spectrometer. In such a case, a comparison can be made between each measurement associated with the calibration gas and the measurement associated with the sample gas. As a consequence, the accuracy of the results of the mass spectrometer are considerably enhanced and the sensitivity of the mass spectrometer is heightened because drift problems associated with electron multipliers or amplifiers are reduced.

In addition to calibrating at predetermined time intervals or with every measurement, such as in the case of monitoring the gaseous components of a patient's breath, the present invention also contemplates that the calibration procedure can be initiated upon the occurrence of one or more predetermiend events, such as a change in mass spectrometer temperature by a predetermined amount, whenever there is a replacement or switching of filaments used in the ion source assembly and/or whenever there is a relatively substantial change in the identity and/or quantity of the gas mixture being analyzed.

Concomitant to the desirability of more frequent calibrations of the mass spectrometer is a related novel feature wherein the gain characteristics of one or more electron multiplier channels is modified prior to use thereof in a mass spectrometer. In particular, the gain of one or more channels is shifted so that the outputs of all of the channels are of a comparable signal level. Briefly, this is accomplished by causing ion current to flow in a channel where it is desirable to reduce the gain thereof. For example, because the high level gases have a much greater signal strength than the low level gases, the method of the present invention involves causing ion current to flow through channels associated with such high level gases until the gain associated therewith will result in an output signal comparable in magnitude to the low level gases.

In view of the foregoing summary description, it is readily discerned that a number of worthwhile objectives of the present invention have been achieved. An apparatus is provided that reduces the amount of calibration gas that is utilized or lost during the calibration of a mass spectrometer. The amount of calibration gas that is used for each calibration is considerably less than that required in prior art calibration techniques associated with mass spectrometers. Related to this feature, significantly more frequent calibration cycles of the mass spectrometer can be made whereby improved accuracy and sensitivity of the apparatus results. Additionally, a much smaller tank for containing calibration gas can be utilized. Furthermore, such a tank can be conveniently located inside the mass spectrometer housing, not outside thereof possibly at an unsightly and too inaccessible a location. Replacement or refilling of the calibration gas tank is reduced. The calibration gas in the tank is also at relatively low pressure. There is no dead or wasted space in the supply line between the output of the calibration gas tank and the calibration gas valve. This feature reduces the amount of time needed to initiate and complete a calibration cycle. The reduction in the amount of time needed to calibrate and the reduced amount of gas required for calibration lead to more frequent calibrations of the mass spectrometer. Such increased calibration cycles can be performed automatically and/or during virtually every sample gas measuring cycle as, for example, during each breath of a patient whereby a comparator function is conducted. Moreover, prior art problems or concerns relating to electron multiplier drift, linear response to the mass spectrometer over decades of possible ion source pressure change, and signal strength difference in channels of the electron multiplier are addressed and solutions therefor are provided.

Additional advantages of the present invention will become readily apparent from the following discussion, when taken in conjunction with the accompanying drawings.

DETAILED DESCRIPTION OF THE INVENTIVE EMBODIMENTS

In accordance with the present invention, apparatus and method are disclosed for reducing the amount of calibration gas utilized and/or wasted during the calibration of a mass spectrometer and for increasing the rapidity of the calibration procedure. Before proceeding with a detailed discussion of the invention, reference is initially made to a pictorial representation of a prior art mass spectrometer system, which will be used in understanding the calibration-related features of the present invention.

Figure 1:
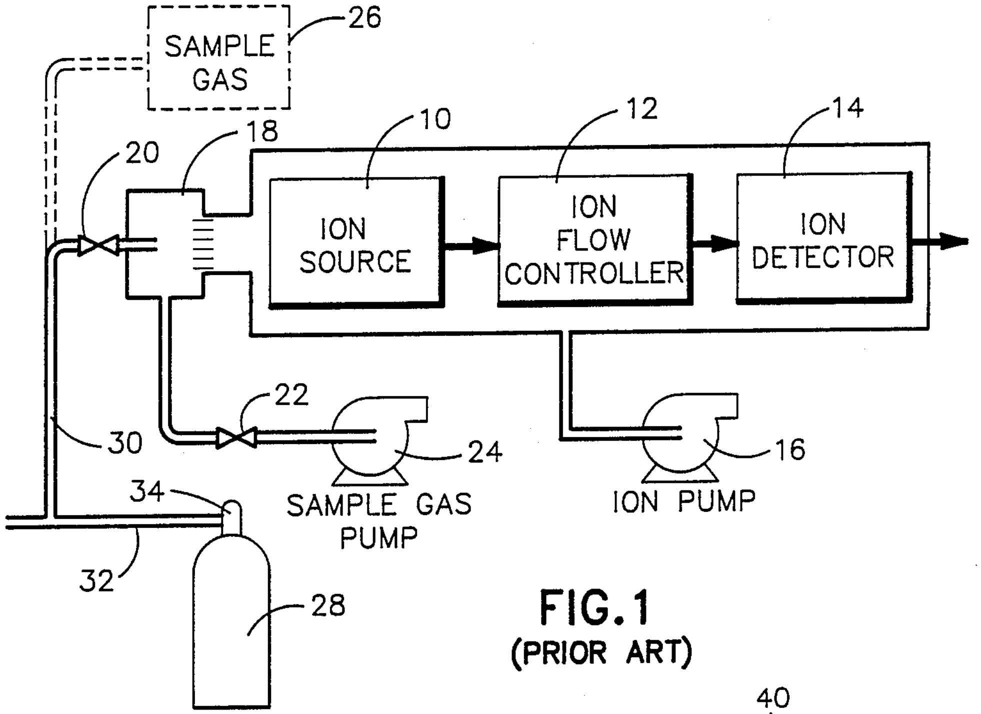
FIG. 1 (PRIOR ART)
FIG. 1 is a pictorial, diagrammatic representation of a prior art mass spectrometer system including calibration-related hardware.

As is typical with conventional mass spectrometers, the mass spectrometer illustrated in FIG. 1 includes an ion source 10 for generating ions from an inputted gas mixture. The output of the ion source 10 is applied to ion flow controller or analyzer 12, which is used in controlling the movement of the ions. An ion detector or collector 14 receives the ions from the flow controller 12 wherein ions are detected according to their differing masses. It is also common practice to amplify the ion current outputted by the detector 14 using a number of electrometer channels or electron multipliers. The amplified signals indicative of gas components are then applied to a microcomputer or the like for processing the signals to determine the concentration of each of the components of the inputted gas mixture.

Prior art mass spectrometers also include a vacuum pump 16, which communicates with the elements of the mass spectrometer in order to provide very low pressures. A molecular flow element 18 controls the supplying of a gas mixture at a fixed, molecular flow to the ion course 10. Communicating with the molecular flow element 18 are two solenoid valves 20, 22. The first solenoid valve 20 is positioned upstream of the molecular flow element 18 while the second solenoid valve 22 is located between a sample gas pump 24 and the molecular flow element 18. The valves 20, 22 are used in permitting or preventing gas flow. The sample gas pump 24 is used in providing gas flow to and through the molecular flow element 18 which element provides a passageway of a predetermined size to the ion source 10. In one known embodiment, the molecular flow element 18 includes an adjustable needle valve. During operation, the sample gas pump 24 typically draws a significant amount of gas to it, which constitutes a fixed bypass flow, thereby wasting gas since such gas is not inputted to the ion source 10.

The inputted gas mixture includes a selected one of a sample gas 26 and a calibration gas contained in a calibration gas tank 28. The sample gas 26 is received at the molecular flow element 18 using a common tube or line 30. The common tube 30 is also used in carrying calibration gas towards the molecular flow element 18. In that regard, the common tube 30 can be moved from connection to the sample gas 26 to a calibration gas line 32 having an inlet for connection to the common tube 30. The calibration gas line 32 is connected to the calibration gas tank 28. The calibration gas is subjected to relatively high pressure. In controlling the pressure of the calibration gas exiting the tank 28, a pressure regulator 34 is utilized. When calibration gas is being supplied to the mass spectrometer, it travels along the calibration gas line 32, which is open to the atmosphere and some of the calibration gas is then carried by the common tube 30 to the molecular flow element 18. The arrangement or connection between the calibration gas line 32 and the common tube 30 assures that downstream elements, such as the mass spectrometer, will not be subject to the high pressures that exist in the pressurized calibration gas tank 28.

The calibration gas tank 28 is commonly pressurized in the range of 1000–2000 psi. The tank 28 is of a size for containing liters of the calibration gas. For each calibration, the typical flow rate of the gas in the calibration gas supply line 32 is about 5 STD cc/sec so that calibration gas will have sufficient force or pressure to flow into the common tube 30 to be carried to the molecular flow element 18. The common tube 30 also constitutes dead or wasted space since, for each calibration, air or sample gas contained therein must be replaced by calibration gas. The time required to displace the air or sample gas in this dead space also adds to the time necessary to complete a calibration cycle. Additionally, the relatively rapid flow rate of the calibration gas results in more gas exiting the pressurized calibration gas tank 28 than is really necessary to provide an accurate calibration of the mass spectrometer. Consequently, much of this calibration gas is lost or wasted.

Figure 2:
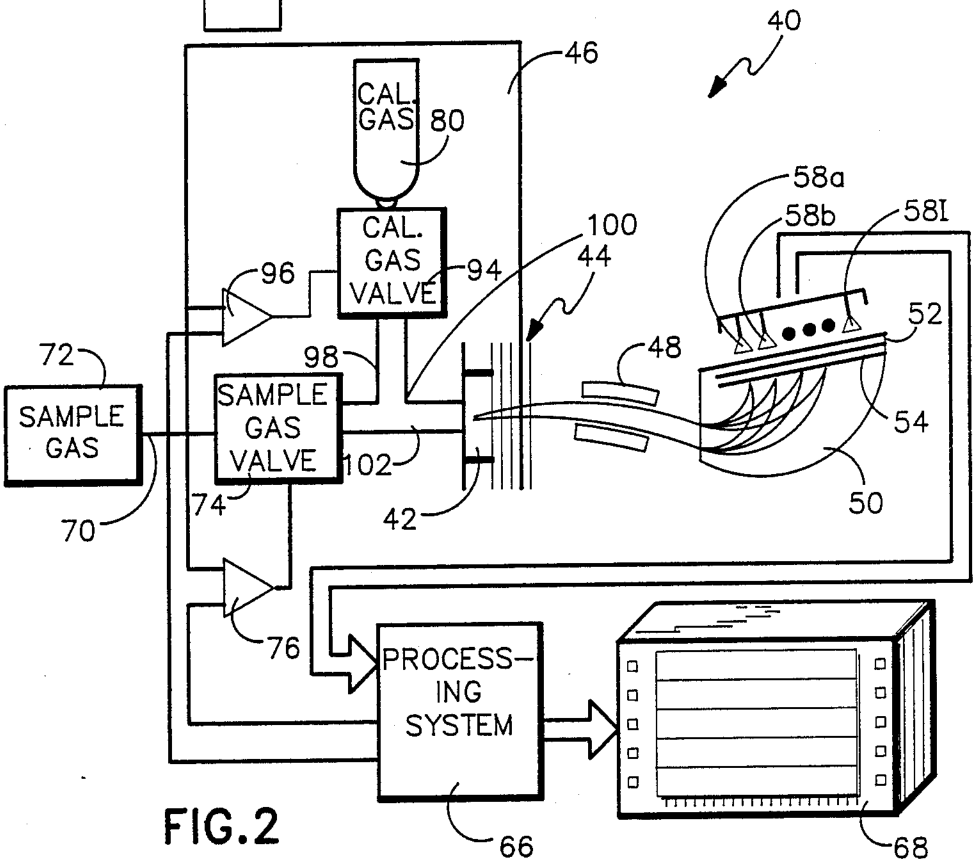
FIG. 2 is a diagrammatic block diagram of the present invention illustrating the relationship and communication among pertinent parts associated with calibrating the mass spectrometer.

With regard to the present invention and with initial reference to FIG. 2, a mass spectrometer is schematically represented and includes hardware used in calibrating the mass spectrometer. The mass spectrometer 40 includes an ion source assembly 42 for generating ions using an inputted fluid mixture. The ion source assembly 42 communicates with an electric field region 44 having a number of spaced, polarized plates, which are used to generate electric fields that are used in forming a desired beam or stream of ions. A control feedback line 46 is used in carrying sensed information obtained from the electric field region 44, which is used in controlling the supply of the inputted gas to the ion source assembly 42. From the electric field region 44, the stream of ions passes through an electrostatic analyzer 48, which includes an electric field for use in controlling the movement of the direction of the ions. The ions are outputed from the electrostatic analyzer 48 to a magnetic field assembly 50, which causes the inputted ions to be directed to an ion collection plate 52 whereby ions contact the ion collection plate at predetermined locations on the collection plage 52. To assist in the desired collection, a shoadow mask 54 is positioned in front of the ion collection plate 52 to prevent or mask out certain, predetermined areas of the ion collection plate 52. A preferred configuration and arrangement of an ion source assembly and an analyzer section of a mass spectrometer, which includes the electric field region 44, electrostatic analyzer 48, and magnetic field assembly 50, is disclosed in U.S. Patent Application Ser. No. 07/107,011, filed Oct. 9, 1987, entitled "Mass Spectrometer Apparatus" and assigned to the same assignee as is the present application, and is hereby incorporated by reference.

The ion collection plate 52 has or communicates with a number of electrometer channels 58, with one embodiment including 12 such electrometer channels **58*a*–58*l*. Each of the electrometer channels 58*a*–58*l* is used in amplifying the ion current received at its input so that a signal is generated having a desired amplitude for subsequent processing. The channels 58*a*–58*l* are illustrated in FIG. 2 as also including conventional amplifiers. The use of such electrometer channels 58*a*–58*l* is conventional and assists in enabling the mass spectrometer 40** to identify and determine gas components. Instead of a multi-channel device, it is also known to utilize a single electron amplifying channel wherein ion current associated with different gas components are sequentially applied to the single channel.

In one embodiment of the invention, instead of the ion collection plate 52, a microchannel plate device 62 is used in amplifying received electrons. Microchannel plate devices are well-known; however, such a device has been altered for operation with the present invention. In particular, with reference to FIG. 5, the microchannel plate device 62 is pictorially represented as having a number of channels CHl through CHn. Although not illustrated, each of the channels would typically communicate at its output with a conventional electronic amplifier. A shadow mask 64 is provided at the input to the microchannel plate device 62. As is well-known, each of the channels would typically have the same gain characteristics. That is, the gain or amplification of the ion current through CH1 would be comparable to the gain of ion current through CH2 and so forth. Because of the difference in signal strength between high level gases such as oxygen and nitrogen and low level or tracer gases, which are expected to be received by the various channels of the microchannel plate device 62, it would be advantageous to provide microchannel plate device outputs that have similar or comparable signal strengths. To achieve this, the ion current associated with the high level gases would essentially need little or no amplification or gain while the ion current associated with the low level gases would be amplified through a range of about $10^3$–$10^6$. The present invention achieves the different gains in the microchannel plate device 62 by a method that conditions selected or desired channels prior to using or incorporating the microchannel plate device 62 in the mass spectrometer apparatus. In particular, one or more channels of the microchannel plate device 62 is selected for gain modification. The selected channels constitute the paths along which ion current associated with high level gases will be carried to processing circuitry. With regard to each selected channel, because the gain thereof is a decreasing function of the total current charge passing through the channel, the amount of gain is reduced by passing a relatively large current charge through the selected channel such that the gain is reduced over a short period of time. Continuously or at predetermined intervals while the selected channel is being conditioned, the channel is also being monitored to determine its gain. When the selected channel has the desired, lower gain, the transmission of the current charge through the channel is discontinued. This process can be repeated for as many channels as is desirable before incorporating the microchannel plate device 62 in the mass spectrometer apparatus.

Figure 5:
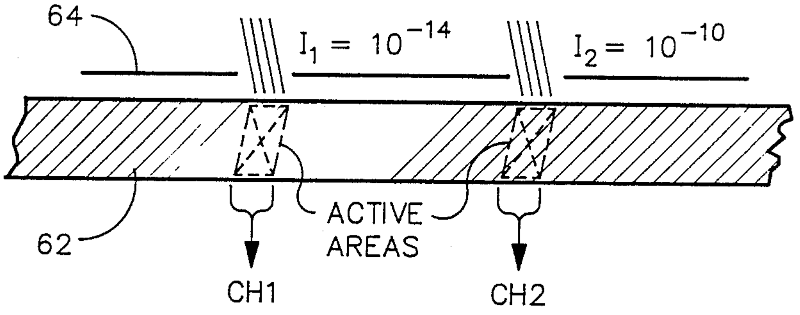
FIG. 5 diagrammatically illustrates a multi-channel electron multiplier or a microchannel plate used in a mass spectrometer and which communicates with signals having substantially different signal strengths.
Figure 6:
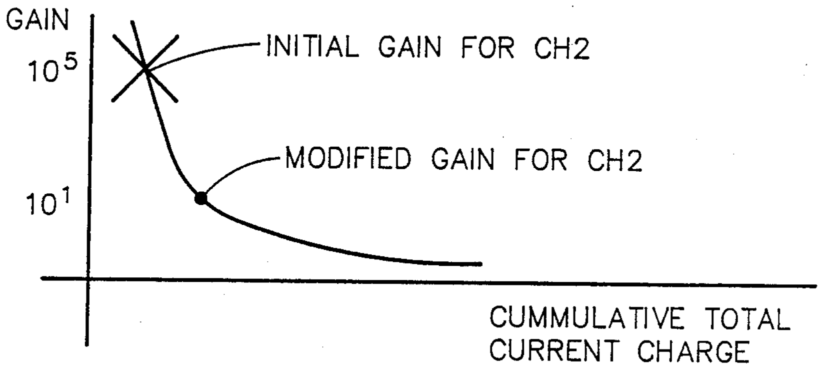
FIG. 6 is a graphic representation of gain in one of the channels of an electron multiplier as a function of total current charge through the channel.

With reference to FIG. 6, a graph associated with the gain for channel CH2 of the microchannel plate device 62 of FIG. 5 is illustrated. As can be understood from this example, CH2 is expected to receive ion current havng four orders of magnitude greater than the ion current expected to be received by channel CH1. To achieve the similar or comparable signal strengths for the two channels, the microchannel plate device 62 is conditioned wherein current charge is caused to flow through the second channel and is monitored until the desired, modified gain is reached. Specifically, prior to conditioning, the second channel has a gain of about $10^5$. Thereafter, current charge is allowed to flow therethrough until a desired gain of $10^1$ is achieved. Once each of the selected channels of the microchannel plate device 62 has its gain suitably modified, the microchannel plate device 62 can then be used with the mass spectrometer apparatus.

In conjunction with conditioning selected channels of a microchannel plate device 62 it remains important to frequently calibrate the mass spectrometer. With the channels of the microchannel plate device 62 having different gain or amplification factors, and with the aging of the channels due to current charge flow through the channels, for example, it is necessary to correct for further gain changes which result during use of the mass spectrometer. Such frequent calibration can be even more important when a microchannel plate device 62 has channels of varying gains because each channel's gain varies differently along its aging curve.

Figure 7:
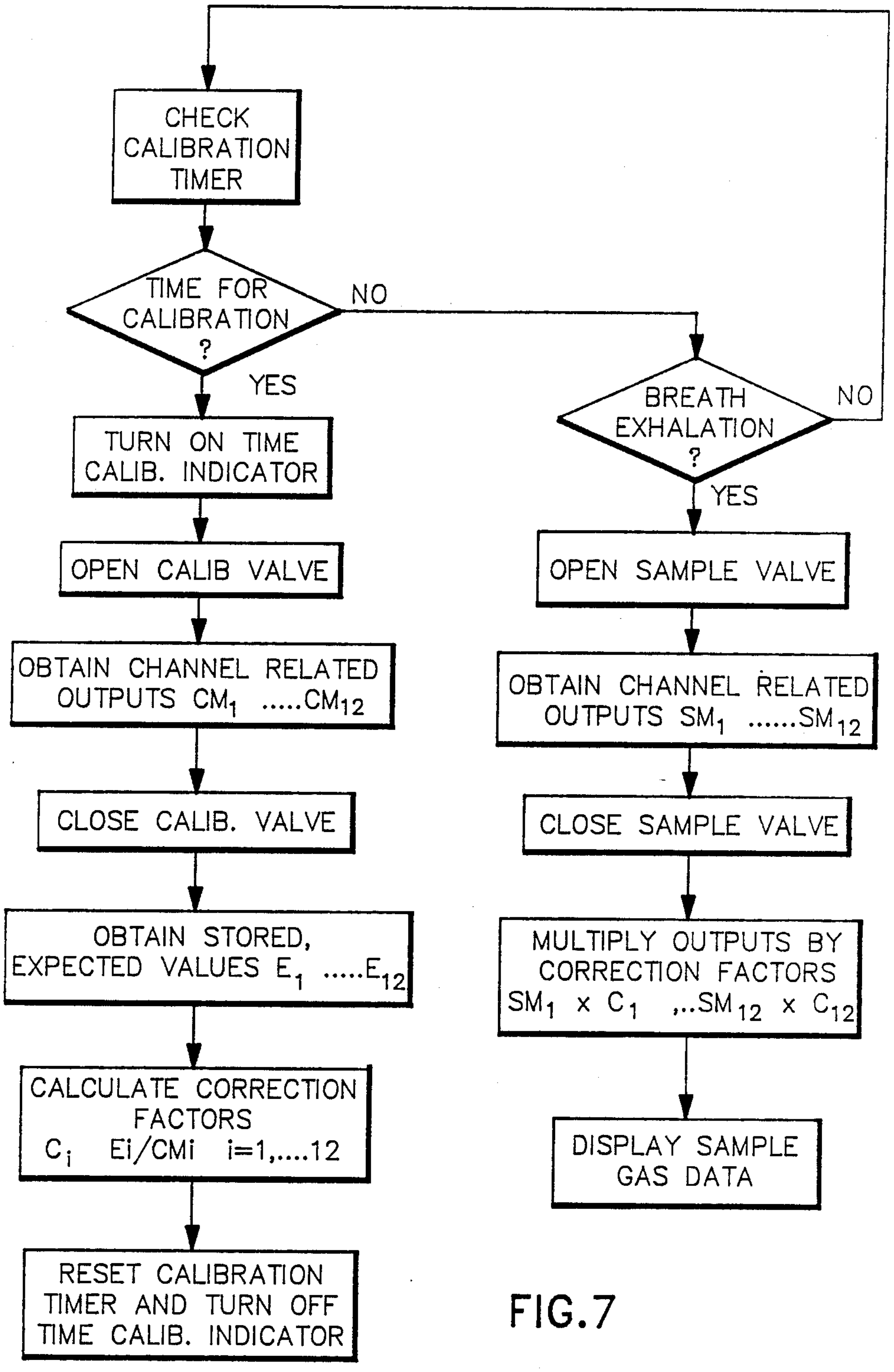
FIG. 7 is a flow diagram illustrating steps associated with automatic calibration based on the passage of a predetermined time interval and also relying on each measurement of an inputted respiratory gas.

Returning to FIG. 2, the outputs of the electrometer channels **58*a*–58*l* are sent to a processing system 66, including a microcomputer, which is programmed for use in analyzing the data or information received by the ion collection plate 52 and applied to the amplifiers of the electrometer channels 58*a*–58*l*. In conjunction with the programmed instructions, software is provided to effect the desired calibration of the mass spectrometer 40. A flow diagram associated with such calibration steps is illustrated in FIG. 7. The calibration-related steps and software will be explained subsequently in connection with a discussion of the calibration operation of the mass spectrometer 40**.

The processing system 66 also communicates with and controls a user display unit 68, which displays selected data and information relating to the inputted gas mixture that has been analyzed by the mass spectrometer 40. On one embodiment, the user display unit 68 is physically separate from, but adjacent to, the remaining parts of the mass spectrometer 40. This physical separation with the necessary communication facilitates the viewing of the user display unit 68 and permits it to be more easily moved as might be desired by the operator.

Figure 3:
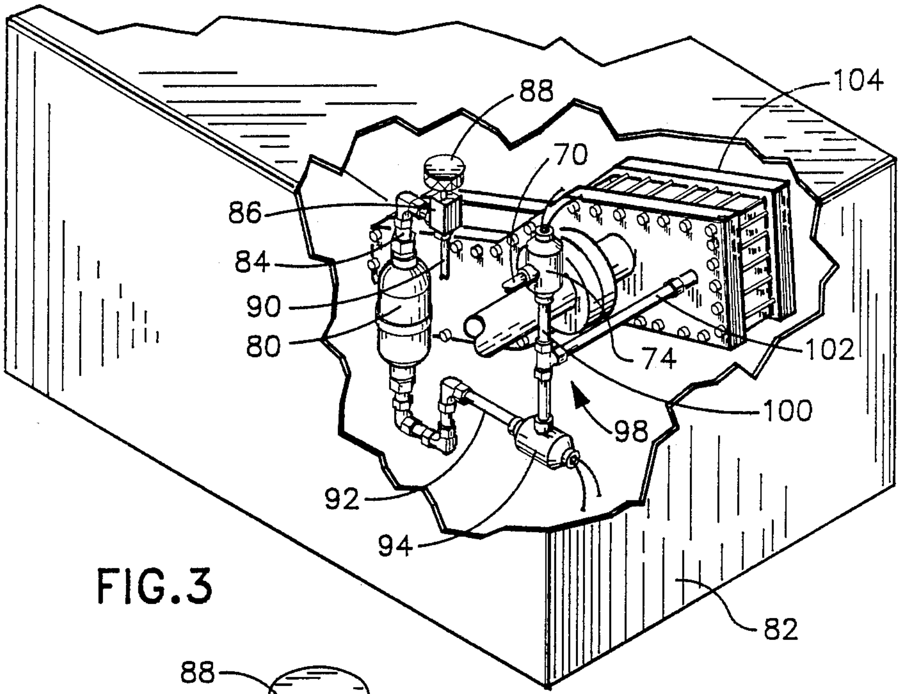
FIG. 3 is a diagrammatic, perspective view of a mass spectrometer housing for containing hardware elements of the mass spectrometer and in which portions of the housing are cut-away to illustrate the calibration gas tank located inside of the housing.
Figure 4:
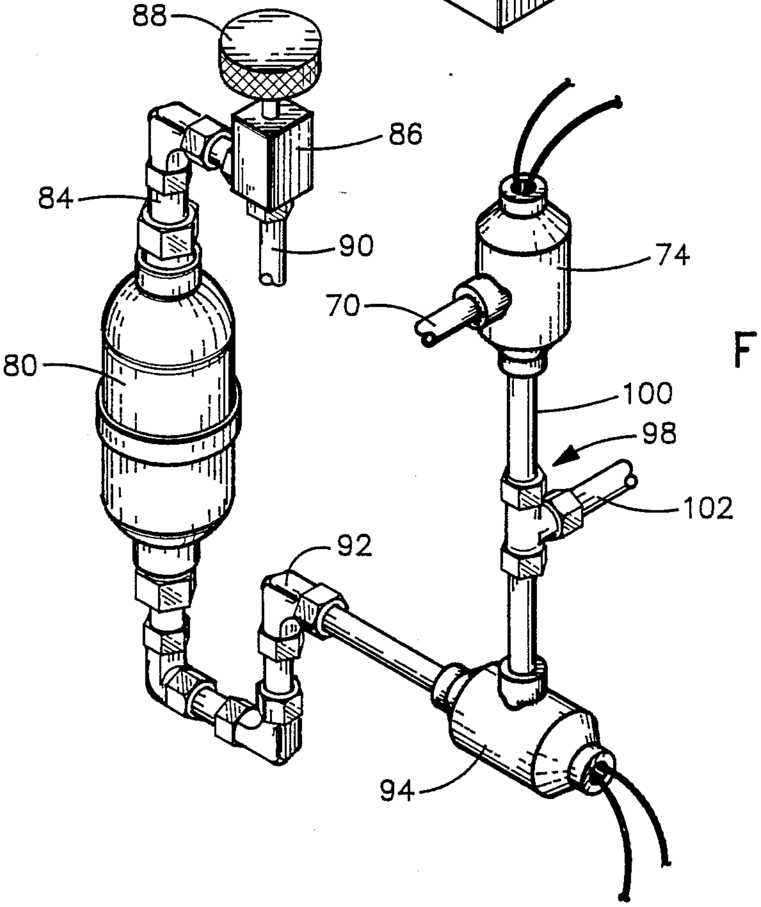
FIG. 4 is an enlarged, perspective view of hardware relating to the calibration gas tank and supply lines for the calibration gas and the sample gas including the common line for carrying a selected one of the calibration gas and the sample gas.

With continued reference to FIG. 2, and with reference to FIGS. 3 and 4 also, the mass spectrometer 40 also includes hardware associated with supplying sample gas and calibration gas to the ion source assembly 42. With regard to the source of sample gas, the source is typically located outside of and spaced from the mass spectrometer 40. In particular, a sample gas supply line 70 carries sample gas 72 from a source, such as respiratory gas exhaled by a patient. The sample gas supply line 70 is connected to a sample gas valve 74, which controllably opens and closes to permit or not permit sample gas flow to the ion source assembly 42. Control over the opening and closing of the sample gas valve 74 resides in the processing system 66 and the servo control provided by the feedback signal transmitted over the control feedback line 46, and which is generated using the electric field region 44 and a comparator 76. The signal generated using the electric field region 44 relates to the ion current being sensed in the ion stream of the electric-field region 44. Depending upon the state of this feedback signal, together with that of a sample valve control signal outputted by the processing system 66, the output of the comparator 76 controls and determines whether or not the sample gas valve 74 should be opened or closed. A more detailed description of suitable servo control is found in U.S. Pat. No. 3,926,209 to Sodal et al. and is hereby incorporated by reference.

With regard to the calibration hardware, a calibration gas tank or canister 80 is provided and is located inside a housing 82 of the mass spectrometer 40, as illustrated in FIG. 3. The calibration gas tank 80 contains a calibration gas, which is used during each calibration cycle of the mass spectrometer 40. The tank 80 is relatively small in size, typically less than the size of conventional calibration gas tanks by a factor of ten or more, which are used with prior art mass spectrometers and which are located outside the housings thereof. The tank 80 typically contains about 5–8 cu. in. of calibration gas. The calibration gas contained in the tank 80 is, preferably, not pressurized. Consequently, no pressure regulator need be utilized with the tank 80.

With particular reference to FIG. 4, inlet piping 84 is connected to one end of the tank 80 for use in filling the tank with calibration gas. The inlet piping 84 is connected to a shut-off valve 86 having a manually-operable valve handle 88. Connected to the input side of the valve 86 is a calibration gas filling line 90. Using the filling line 90, the tank 80 can be refilled with calibration gas using a source of calibration gas, which is positioned exteriorly of the housing 82 and which would typically be a much larger sized container than the tank 80. During the filling process, the shut-off valve 86 is opened. The opposite end of the tank 80 communicates with supply piping 92 for carrying calibration gas to a calibration gas valve 94. The calibration gas valve 94, like the sample gas valve 74, is electronically controlled using the processing system 66 and servo control. The servo control is provided by a signal relating to the sensed ion current in the electric field region 44, which signal is applied to a comparator 96. The comparator 96 receives a calibration gas valve control signal from the processing system 66 whereby the two signals are utilized together or compared for controlling the opening/closing of the calibration gas valve 94.

As best seen in FIGS. 3 and 4, the calibration gas passes from the valve 94 to T-shaped piping 98 having a vertical leg 100 and a horizontal leg 102. The T-shaped piping 98 is common to both the output from the sample gas valve 74 and the output from the calibration gas valve 94. The lateral leg or supply line 102 is connected to a mass spectrometer apparatus 104 and, in particular, the lateral leg 102 communicates with and is directly connected to the ion source assembly 42. The preferred mass spectrometer apparatus 104 is described in detail in the afore-noted Ser. No. 07/107,011.

Important to the calibration features of the present invention are the characteristics of the sample gas valve 74 and calibration gas valve 94. A most preferred valve is the valve disclosed in U.S. Pat. No. 4,560,871, entitled "Actuator for Control Valves and Related Systems" and assigned to the same assignee as the present invention. Such a valve is a fast-acting servo controlled valve which has excellent sealing characteristics, e.g., the helium leak rate in the closed valve position is less than $1\times10^{-10}$ STD cc/sec. The valve 94 can control the flow rate of calibration gas to orders of magnitude less than the flow rate found in prior art mass spectrometers. The valve 94 is able to output calibration gas at flow rates of $10^{-2}$ STD cc/sec and less; whereas, known prior art systems have a flow rate of about 1 STD cc/sec. Also, during calibration, the calibration gas valve 94 can be controlled to vary the flow rate of calibration gas therethrough over a number of orders to magnitude or decades of dynamic range, such as between about $10^{-4}$ and $10^{-8}$ STD cc/sec. This control enables the present invention to conduct a linearity check of the mass spectrometer to correct for any nonlinearity that may arise whenever the ion source assembly pressure changes due to changes in the gas flow rate. In addition, a typical calibration procedure in the present invention requires only about $10^{-5}$ STD cc of calibration gas. Consequently, the small calibration tank utilized in the present invention contains sufficient calibration gas to last for many years of use since only approximately 5 STD cc of calibration gas would be utilized over about a 5 year period, even if the mass spectrometer were calibrated every minute of the day.

Improved response time also results when conducting the calibration cycle in accordance with the present invention. Response time is a function of wasted or dead space, which is to be occupied by calibration gas when the calibration procedure is performed. There is no dead space in the present invention since dead space would normally refer to the space defined between the calibration gas tank 80 and the inlet side of the calibration gas valve 94, or that space along which the gas flow is non-molecular flow, and because calibration gas always occupies this space such dead or wasted space does not exist.

The ability to greatly reduce the amount of calibration gas required for each calibration cycle readily lends itself to more frequent and automatic calibration of the mass spectrometer 40. With reference to FIG. 7, the present invention includes software for causing automatic calibration of the mass spectrometer 40 at predetermined time intervals. Such predetermined time intervals could, in some cases, correspond to a continuous alternation between calibration and a measurement of the sample gas. By so doing, a comparison can be made on each measurement of the sample gas using the calibration gas results to improve the accuracy of the determination of the concentration of gas components of the inputted gas mixture. For example, the predetermined time interval could be adjusted to correspond to the breathing cycle of a patient in which the inputted gas mixture consists of respiratory gas.

As can be seen in the flow diagram of FIG. 7, the calibration procedure or cycle is based on the passage of a predetermined time period. In the embodiment illustrated, this calibration cycle is tied to monitoring the breathing of a patient, who is supplying the sample gas mixture to the mass spectrometer 40. A check is initially made to determine whether a predetermined time interval has passed. If so, a visual indication that the calibration cycle is in process can be provided to the user or operator, namely, by means of the time-calibration indicator or light. The calibration gas valve 94 is opened using the calibration valve control signal from the processing system 66 while the same gas valve 74 is closed. The calibration gas is received by the ion source assembly 42 and subsequently analyzed in the analyzer section of the mass spectrometer 40. The ions contacting the ion collection plate 52 are amplified using the electrometer channels including the amplifiers 58. Values relating to the outputs of the electrometer channels 58, or a sequentially accessed single channel, are obtained and stored as they relate to the gas concentrations of the components of the inputted calibration gas. These outputs can be defined as the measured calibration gas (CM) outputs representing the concentrations of the components of the inputted calibration gas and in the case of the multichannel device, the number of available measured outputs depending upon the number of corresponding areas masked on the ion collection plate 52. In one embodiment, the number of areas is twelve. At the completion of the receipt of information relating to the identity of the gas components in the form of ion current provided at the ion collection plate, the calibration gas valve 92 can be closed so that the sample gas can now be inputted to the ion source assembly 42. Preferably, the processing system 66 controls the opening and closing of the valves 74, 94 such that one of the valves 74, 94 is being opened at the same time the other of the two valves 74, 94 is being closed.

As FIG. 7 illustrates, previously stored in the memory of the processing system 66 are one or more of predetermined, expected (E) values associated with the calibration gas. Each of such values is associated with one of the electrometer channels 58 and each would be the expected value based on an initial calibration of the mass spectrometer 40, which was made at final assembly or manufacture thereof. However, due to electrometer channel drift over time, for example, it is frequently the case that there is a difference between the measured (CM) value and the corresponding expected (E) value for one or more of the electrometer channels 58. Consequently, for each of the electrometer channels 58, a correction (C) factor is determined or calculated, which represents the ratio between the expected value for an electrometer channel and its corresponding measured value. The correction factors for each of the electrometer channels 58 are stored in the memory of the processing system 66. At the completion of the calibration cycle, the counter associated with monitoring the time between calibration cycles is reset to begin monitoring the passage of the predetermined time interval and the visual indicator relating to the time calibration cycle is automatically turned off.

In the case in which the predetermined time interval has not passed and for the case where the sample gas is the exhaled breath of a patient, the sample gas valve 74 is opened under processing system 66 control, while the calibration gas valve 94 is closed. As with the calibration cycle, values relating to the electrometer channel outputs are obtained after the sample gas has been ionized and has passed through the analyzer section of the mass spectrometer 40. Upon obtaining the electrometer channel outputs associated with one or more of the ion collection plate areas that have been contacted by the ions, the sample gas valve 74 can be closed and, when so programmed, the calibration cycle can once again be automatically initiated. To complete the identification and determination of the relative presence of the gaseous components of the inputted sample gas mixture, each of the measured sample gas (SM) electrometer channel outputs is multiplied by its corresponding correction (C) factor in order to determine the relative concentration of each of the gas components of the sample gas. These determinations are made by the processing system 66, which then controls the displaying of the measured values on the user display unit 68, which sample gas measured values can then be viewed or inspected by the operator of the present invention.

As can be readily understood, the processing system 66 including the computer software is able to automatically control the alternation between the calibration cycle and the measurement of a sample gas. In this regard, the calibration cycle can be repeated to occur less than every minute and, for example, every predetermined number of seconds or less whereby a calibration cycle can be performed alternately with each measurement cycle. In the illustrated embodiment, the calibration could be performed after each breath to provide a continuous re-calibration procedure for each breathing cycle. This is in contrast to known prior art mass spectrometer calibration systems in which the mass spectrometer is calibrated as infrequently as every predetermined number of hours or days.

The capability of the present invention to rapidly perform frequent calibrations leads to the implementation of a comparing function. In cases in which one or more of the calibration gas components corresponds substantially to certain expected gas components of a sample gas mixture, a comparison can be made after each measurement of the sample gas using the results of the previous calibration. In such a manner, a direct comparison is made btween the measurement results associated with the reference or calibration gas and the component gas of the sample gas. Any difference is noted and corrected for to improve mass spectrometer performance. For example, if the reference gas is known to include a certain concentration of oxygen and this concentration is not found as a result of the calibration procedure, the processing system can correct the oxygen reading or determination made when the sample gas is measured alternately with the reference gas. This frequency of calibration procedure does not permit the oxygen reading to vary, e.g., due to drift problems, because the calibration is conducted for each sample gas measurement whereby any variance is immediately removed or accounted for.

In addition to calibrating the mass spectrometer 40 based on the passage of a predetermined time interval, the present invention also contemplates calibration thereof based on the occurrence of one or more additional events associated with mass spectrometer operation. Specifically, the calibration procedure could be initiated each time a temperature change of the mass spectrometer of a predetermined amount is detected. Calibration steps could also be started when there is a significant change in the ratio of sample gas components that are detected. A further event that could trigger calibration is the changing or switching of an ion source filament used in generating the ions from the inputted gas mixture.

It should also be appreciated that the features of the present invention could be incorporated in a multiple tank configuration whereby multiple point calibration can be achieved, as well as the one point calibration having a single calibration gas tank which is more fully desclosed herein.

Based on the foregoing description, a number of important features of the present invention are immediately recognized. Method and apparatus are provided to greatly increase the frequency of calibration of a mass spectrometer. Each calibration cycle can be performed with as little as $10^{-5}$ STD cc of calibration gas being used. Consequently, the calibration gas contained in the calibration tank will last for many years before being refilled or replaced. The flow rate of the calibration gas out of the calibration gas valve can be controlled to be significantly lower than that in prior art mass spectrometer systems. Because of the small amounts of calibration gas that are utilized to perform a calibration cycle and because of the particular characteristics found in the calibration gas valve, the calibration procedure can be conducted over a wide range of flow rates whereby ion source pressure is varied to check the linearity of the mass spectrometer. As a result, any non-linearity can be corrected for. Additionally, signal drift problems can be overcome more readily by the frequent calibration of the mass spectrometer. Importantly, the present invention also relates to conditioning a microchannel plate device so that the outputs thereof have a similar or comparable signal strength. Furthermore, dead space associated with the piping or tubing for carrying the calibration gas at or near atmospheric pressure is eliminated. Leaking of calibration gas pass its associated valve is virtually nonexistent. Because of the extremely small amounts of calibration gas required for each calibration cycle, automatic calibration can be provided based on the passage of a predetermined time interval. When suitable or desirable, such as monitoring the respiratory gases of a patient, the calibration cycle can be alternately conducted with the measurement cycle. Also, the tank containing the calibration gas can be located inside the mass spectrometer instrument housing. And, the calibration gas contained in the tank need not be pressurized. All of the foregoing characteristics of the present invention result in reducing the amount of calibration gas utilized or lost during each calibration cycle, while improving the accuracy and sensitivity of the mass spectrometer.

The foregoing discussion of the invention including the numerous embodiments has been presented for the purposes of illustration and description. They are not intended to be exhaustive or to limit the invention to the precise form disclosed, and other modifications and variations may be possible in light of the above teachings. The embodiments were chosen and described in order to best explain principles associated with the invention and its practical application to thereby enable others of ordinary skill in the art to best utilize the invention in further various embodiments and various modifications as are suited to the particular use contemplated. It is intended that the appended claims be construed to include other alternative embodiments of the invention except insofar as limited by the prior art.

What is claimed is:

1. A method for automatically calibrating a mass spectrometer, comprising:

providing a housing containing a mass spectrometer apparatus used for generating ions and analyzing the ions;

providing canister means for containing and supplying calibration gas to said mass spectrometer apparatus;

providing a calibration gas valve communicating with said mass spectrometer apparatus and said canister means;

providing means for processing information relating to one or more components of said calibration gas;

providing output line means connected between said calibration gas valve and said canister means;

opening said calibration gas valve;

controlling calibration gas to flow into said mass spectrometer apparatus from said calibration gas valve at a rate less than about $10^{-2}$ STD cc/sec;

preventing the presence of sample gas in said output line means wherein gas flow in said output line means is substantially non-molecular whereby the formation of dead space in the mass spectrometer is reduced;

using said mass spectrometer apparatus to analyze ions of said calibration gas components;

processing information relating to said ions; and calibrating the mass spectrometer apparatus using said processed information.

2. A method, as claimed in claim 1, wherein:

said step of providing said canister means includes locating said canister means entirely within said housing.

3. A method, as claimed in claim 1, wherein:

said step of providing canister means includes containg said calibration gas at low pressure relatively close to atmospheric pressure.

4. A method, as claimed in claim 1, further including:

monitoring the breathing cycle of a patient;

inputting a sample gas from the patient to a sample gas valve;

opening said sample gas valve during at least portions of the expiration part of the breathing cycle of the patient.

5. A method, as claimed in claim 1, wherein:

said step of allowing includes permitting said calibration gas to flow from said calibration gas valve at a rate between about $10^{-4}$–$10^{-8}$ STD cc/sec.

6. A method, as claimed in claim 1, wherein:

said step of allowing includes providing calibration gas in an amount of about $10^{-5}$ STD cc or less for one calibration of the mass spectrometer.

7. A method for calibrating a mass spectrometer, comprising:

providing an electron multiplier device having at least a first channel, said first channel having associated with it a gain of a first magnitude;

conditioning said first channel wherein said first channel gain is changed from said first magnitude to a second magnitude wherein said conditioning step includes supplying current charge to said first channel to reach said second magnitude of gain and monitoring the change in gain of said first channel to determine when said second magnitude of gain is reached;

incorporating said electron multiplier device with a mass spectrometer apparatus including means for generating ions and means for analyzing said ions;

providing canister means for containing and supplying calibration gas;

providing a calibration gas valve communicating with said mass spectrometer apparatus and said canister means;

opening said calibration gas valve to permit calibration gas to be ionized and analyzed in said mass spectrometer apparatus;

processing information relating to said ionized calibration gas; and calibrating the mass spectrometer apparatus using said processed information.

8. An apparatus for calibrating a mass spectrometer, comprising:

a housing;

input means for carrying sample gas;

a sample gas valve contained within said housing and communicating with said input means for controlling the flow of the sample gas;

ion source means contained within said housing for generating ions from said sample gas;

analyzing means contained within said housing and communicating with said ion source means for controlling movement of the ions;

processing means communicating with said analyzing means for processing information related to the ions to determine the relative presence of gas components;

canister means for containing and supplying calibration gas, said canister means being located entirely within said housing;

a calibration gas valve contained within said housing and communicating with said canister means for controlling the flow of the calibration gas wherein calibration gas in an amount of about $10^{-5}$ STD cc or less is provided for calibration or the mass spectrometer;

output line means connected between said canister means and said calibration gas valve wherein no sample gas is present in said output line means and wherein gas flow is non-molecular in said output line means so that no dead space is formed whereby wasted calibrated gas is avoided; and supply line means contained within said housing for supplying a selected one of the sample gas and the calibration gas to said ion source means.

9. An apparatus, as claimed in claim 8, wherein:

said processing means includes means for monitoring time between calibrations so that it can be determined whether or not a predetermined interval of time has passed from a previous calibration whereby, if such a predetermined interval of time has passed, another calibration of the mass spectrometer apparatus can be provided.

10. An apparatus, as claimed in claim 8, wherein:

said processing means includes means for controlling the opening of said calibration gas valve to achieve flow rates in the range of about $10^{-4}$–$10^{-8}$ STD cc/sec.

11. An apparatus, as claimed in claim 8, wherein:

said canister means contains calibration gas at low pressure and relatively close to atmospheric pressure.

12. An apparatus, as claimed in claim 8, wherein:

said canister means includes a canister having a capacity of between about 5–8 cubic inches of calibration gas.

13. An apparatus, as claimed in claim 8, wherein:

said canister means includes a tank containing calibration gas and said supply means includes a common line communicating with both said calibration gas valve and said sample gas valve, said common line terminating at said ion source means, and wherein each of said calibration gas valve, said sample gas valve, said tank, said output line means, and said common line is contained within said housing.

14. An apparatus for calibrating a mass spectrometer, comprising:

input means for carrying sample gas;

a sample gas valve communicating with said input means for controlling the flow of the sample gas;

ion source means communicating with the sample gas for generating ions using the sample gas;

analyzing means communicating with said ion source means for controlling movement of said ions;

processing means communicating with said analyzing means for processing information related to said ions to determine the relative presence of gas components;

a source of calibration gas;

a calibration gas valve communicating with said source of calibration gas for controlling the flow of the calibration gas wherein said calibration gas valve permits calibration gas to flow therefrom at a rate less than about $10^{-2}$ STD cc/sec;

output line means connected between said calibration gas valve and said source of calibration gas wherein no sample gas is present in said output line means and wherein gas flow in said output line means is non-molecular whereby the formation of dead space in the mass spectrometer is reduced; and supply line means contained within said housing for supplying a selected one of the sample gas and the calibration gas to said ion source means.

* * * * *